(12) United States Patent
Hsiao et al.

(10) Patent No.: US 9,372,301 B2
(45) Date of Patent: Jun. 21, 2016

(54) BACKLIGHT MODULE AND LIQUID CRYSTAL DISPLAY INCLUDING THE SAME

(71) Applicant: SHENZHEN CHINA STAR OPTOELECTRONICS TECHNOLOGY CO., LTD., Shenzhen, Guangdong (CN)

(72) Inventors: Yu Chun Hsiao, Shenzhen (CN); Shih Hsiang Chen, Shenzhen (CN); Gege Zhou, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 102 days.

(21) Appl. No.: 14/240,358

(22) PCT Filed: Jan. 24, 2014

(86) PCT No.: PCT/CN2014/071413
§ 371 (c)(1),
(2) Date: Feb. 21, 2014

(87) PCT Pub. No.: WO2015/018193
PCT Pub. Date: Feb. 12, 2015

(65) Prior Publication Data
US 2015/0212257 A1  Jul. 30, 2015

(30) Foreign Application Priority Data
Aug. 9, 2013  (CN) .......................... 2013 1 0346933

(51) Int. Cl.
*F21V 8/00* (2006.01)
*G02F 1/1368* (2006.01)
*G02F 1/1333* (2006.01)

(52) U.S. Cl.
CPC ............ *G02B 6/0085* (2013.01); *G02B 6/0091* (2013.01); *G02F 1/1368* (2013.01); *G02F 1/133308* (2013.01); *G02F 2001/133322* (2013.01); *G02F 2201/503* (2013.01)

(58) Field of Classification Search
None
See application file for complete search history.

(56) References Cited

U.S. PATENT DOCUMENTS 7,113,237 B2 *  9/2006  Nitto et al. ...................... 349/58
7,576,976 B2 *  8/2009  Kawano .................... 361/679.21
(Continued)

FOREIGN PATENT DOCUMENTS

CN  201547104 U  8/2010
CN  101842826 A  9/2010
(Continued)

OTHER PUBLICATIONS

Chinese Search Report issued Jan. 19, 2015, to the corresponding Chinese Application No. 2013103469331.
(Continued)

*Primary Examiner* — Britt D Hanley
(74) *Attorney, Agent, or Firm* — Stein IP, LLC

(57) ABSTRACT

The present disclosure relates to a backlight module and a liquid crystal display using the backlight module. The backlight module comprises an outer frame, a glue frame, a bending heat dissipating plate, and a light guide plate all amounted within the outer frame, a light source lamp facing the light guide plate being arranged on the side wall of the heat dissipating plate at the light-incoming side of the light guide plate. An inserting port is formed on the glue frame, a first positioning hole corresponding to the inserting port is formed on the side wall of the heat dissipating plate at the light-incoming side of the light guide plate, and a second positioning hole corresponding to the first positioning hole is formed on the outer frame. The portion of the outer frame around the second positioning hole is depressed inwards and extends into the inserting port to position the glue frame. The outer frame, the glue frame, and the heat dissipating plate are fixed together by a fixing bolt passing through the first positioning hole and the second positioning hole. The backlight module according to the present disclosure is able to greatly narrow the frame of the liquid crystal display without causing other problems to the liquid crystal display.

11 Claims, 2 Drawing Sheets

(56) References Cited

U.S. PATENT DOCUMENTS

| | | | |
|---|---|---|---|
| 2001/0019377 A1 | 9/2001 | Fukayama et al. | 349/58 |
| 2001/0050732 A1* | 12/2001 | Okamoto et al. | 349/58 |
| 2011/0051033 A1* | 3/2011 | Shimizu | 349/58 |
| 2011/0063875 A1* | 3/2011 | Yang et al. | 362/621 |
| 2011/0085107 A1* | 4/2011 | Noh et al. | 349/61 |
| 2012/0188485 A1* | 7/2012 | Cheon | 349/65 |
| 2012/0287368 A1* | 11/2012 | Que et al. | 349/58 |
| 2012/0287666 A1* | 11/2012 | Kwon et al. | 362/602 |
| 2013/0201421 A1* | 8/2013 | Yu | 349/58 |
| 2014/0036202 A1* | 2/2014 | Tang et al. | 349/62 |
| 2014/0071378 A1* | 3/2014 | Zhou | 349/62 |

FOREIGN PATENT DOCUMENTS

| | | | |
|---|---|---|---|
| CN | 102352991 A | | 2/2012 |
| CN | 102494275 A | | 6/2012 |
| CN | 202328047 U | | 7/2012 |
| CN | 102621718 A | | 8/2012 |
| CN | 102749738 A | * | 10/2012 |
| CN | 103438387 A | | 12/2013 |
| JP | 2003-75809 A | | 3/2003 |

OTHER PUBLICATIONS

International Search Report dated May 14, 2014, issued to the corresponding International Application No. PCT/CN2014/071413.

* cited by examiner

BACKLIGHT MODULE AND LIQUID CRYSTAL DISPLAY INCLUDING THE SAME

FIELD OF THE INVENTION

The present disclosure relates to a liquid crystal device, in particular to a backlight module and a liquid crystal display including the backlight module.

BACKGROUND OF THE INVENTION

Thin film transistor liquid crystal display (namely TFT-LCD) is one of the major types of flat panel displays at present, and is widely used in electronic equipment. A backlight module of TFT-LCD mainly comprises s a back plate, a light guide plate, a light bar, a heat dissipating plate, an optical diaphragm, a glue frame, a front frame, and the like.

Currently, the frame of a liquid crystal display tends to be narrower and narrower, which requires that of the backlight module to be narrower. Thus, in order to narrow the frame, the back plate can be removed. However, in this case the mechanical strength of the whole backlight module might be greatly weakened, which would easily lead to other problems. Another option is to narrow the glue frame, which, however, can only narrow the frame of the liquid crystal display to a lesser extent. In addition, a narrower frame can be realized by providing a thinner side wall of the heat dissipating plate, but this would negatively influence the heat dissipating effect of the liquid crystal display. Therefore, a method of greatly narrowing the frame without leading to other problems to the liquid crystal display is needed.

SUMMARY OF THE INVENTION

To solve the above technical problems in the prior art, the present disclosure proposes a backlight module which can greatly narrow the frame of a liquid crystal display without leading to other problems to the liquid crystal display. The present disclosure further relates to a liquid crystal display using the backlight module.

(1) According to a first aspect of the present disclosure, a backlight module is proposed. Said backlight module comprises an outer frame, and a glue frame, a bent heat dissipating plate, and a light guide plate all mounted within the outer frame, a light source lamp facing the light guide plate being arranged on the side wall of the heat dissipating plate at the light-incoming side of the light guide plate.

An inserting port is formed on the glue frame, a first positioning hole corresponding to the inserting port is formed on the side wall of the heat dissipating plate at the light-incoming side of the light guide plate, and a second positioning hole corresponding to the first positioning hole is formed on the outer frame. The portion of the outer frame around the second positioning hole is depressed inwards and extends into the inserting port to position the glue frame. The outer frame, the glue frame and the heat dissipating plate are fixed together by a fixing bolt passing through the first positioning hole and the second positioning hole.

According to the backlight module of the present disclosure, the light source lamp is directly arranged on the heat dissipating plate so that components for mounting the light source lamp can be saved, thus the objectives of greatly narrowing the frame of the liquid crystal display and greatly improving the heat dissipating performance of the backlight module can be achieved. Moreover, the backlight module with such a structure further enables the glue frame to be positioned.

(2) In an embodiment of (1) of the present disclosure, the fixing bolt comprises a body with a cylinder and an accommodation groove, and a screw in cooperation with the accommodation groove. When being assembled, the cylinder is fixedly connected to the first positioning hole, and the accommodation groove, facing away from the light guide plate, is accommodated in the second positioning hole, with the screw fixedly coupled to the accommodation groove from a region outside the outer frame and compressing the outer frame. In a specific example, the cross section of the cylinder is smaller than that of the accommodation groove. The cylinder is in rivet connection with the first positioning hole, and the screw is in threaded connection with the accommodation groove.

With such a structure, the cylinder having a relatively small cross-section requires relatively small first positioning hole, thus causing relatively small damage to the heat dissipating plate and facilitating the production of the heat dissipating plate. The screw is indirectly connected to the heat dissipating plate through the body of the fixing bolt, so that the force applied on the heat dissipating plate is relatively small, and thus the outer frame, the glue frame and the heat dissipating plate can be assembled under the condition that the relatively thin heat dissipating plate is protected from damage. The threaded connection between the screw and the accommodation groove renders the assembly of the backlight module easier.

(3) In one of the embodiments of (1) or (2) of the present disclosure, the cylinder of the fixing bolt does not protrude out of the inner surface of the heat dissipating plate. In this case, a light source lamp can be arranged in a convenient manner, and light emitted by the light source lamp will not be blocked, so that the brightness of the backlight module can be improved.

(4) In any one of embodiments of (1) to (3) of the present disclosure, the outer end of the screw does not protrude out of the plane of the outer frame. Projections are not formed on the outer surface of the outer frame, thus the appearance of the product can be improved. In addition, the outer frame without projection will not get other objects hooked, so that the safety of the backlight module and a liquid crystal display using the backlight module can be improved.

(5) In an embodiment of (1) of the present disclosure, the fixing bolt comprises a cylinder and a locking cap in cooperation with the cylinder. When being assembled, the cylinder is configured to extend through the first positioning hole and the second positioning hole, a first end portion of the cylinder is fixedly connected to the first positioning hole, and the locking cap is fixedly coupled to a second end portion of the cylinder from a region outside the outer frame. In an example, the cylinder is in the shape of a stepped shaft, wherein a portion with relatively small cross-section in the cylinder is the first end portion, and a portion with relatively large cross-section is the second end portion. The first end portion of the cylinder is in rivet connection with the first positioning hole, and the locking cap is in threaded connection with the second end portion of the cylinder. In the stepped shaft shaped cylinder, the first end portion with a relatively small cross-section causes relatively small damage to the heat dissipating plate, thus facilitating the production of the heat dissipating plate. The locking cap is indirectly connected to the heat dissipating plate through a fixing bolt, so that the force applied on the heat dissipating plate is relatively small, and the outer frame, the glue frame and the heat dissipating plate can be assembled under the condition that the relatively thin heat dissipating plate is protected from damage. The threaded connection between the locking cap and the cylinder renders the assembly of the backlight module easier.

(6) In one of the embodiments of (1) or (5) of the present disclosure, the first end portion of the cylinder does not protrude out of the inner surface of the heat dissipating plate. In this case, a light source lamp can be arranged in a convenient manner, and light emitted by the light source lamp will not be blocked, so that the brightness of a backlight module can be improved.

(7) In an embodiment of (6) of the present disclosure, neither the second end portion of the cylinder nor the locking cap protrudes out of the plane of the outer frame. No projection is formed on the outer surface of the outer frame, thus the appearance of a product can be improved. In addition, the outer frame without projection will not get other objects hooked, so that the safety of the backlight module and a liquid crystal display using the backlight module can be improved.

(8) According to a second aspect of the present disclosure, a liquid crystal display using the above backlight module is proposed.

In this application, the term "the interior of the side wall of the heat dissipating plate" refers to the side wall of the heat dissipating plate facing the lateral surface of the light guide plate.

Compared with the prior art, the present disclosure has the following advantages. The light source lamp is directly arranged on the heat dissipating plate, saving components for mounting the light source lamp, thus fulfilling the objectives of greatly narrowing the frame of the liquid crystal display and greatly improving the heat dissipating performance of the backlight module. The fixing bolt of the present disclosure can fix the heat dissipating plate, the glue frame, and the outer frame together, and affects the heat dissipating plate to a lesser extent. Moreover, the backlight module of the present disclosure is simple in structure and convenient to assemble.

BRIEF DESCRIPTION OF THE DRAWINGS

The present disclosure is described in more details below based on the examples with reference to the accompanying drawings, wherein.

In the accompanying drawings, the same components use the same reference signs. The accompanying drawings are not drawn to actual scale.

DETAILED DESCRIPTION OF THE EMBODIMENTS

The present disclosure is further illustrated below in conjunction with the accompanying drawings.

Figure 1:
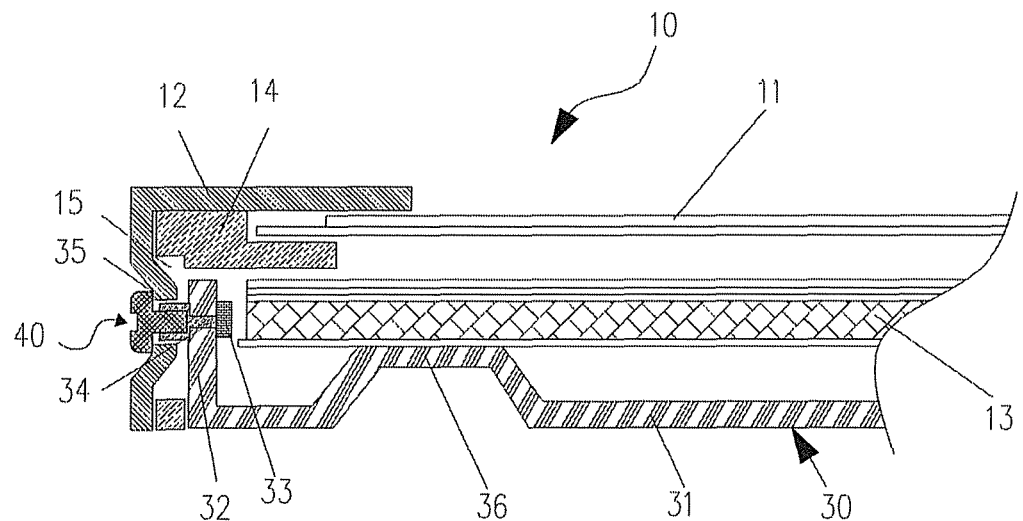
FIG. 1 schematically shows the cross section of a first example of the liquid crystal display according to the present disclosure.

FIG. 1 schematically shows a cross section diagram of a liquid crystal display 10 according to a first example of the present disclosure. The liquid crystal display 10 mainly comprises a panel 11 and a backlight module. It shall be understood that the liquid crystal display 10 further comprises other components, which, along with their assembly structures, are known to those skilled in the art. For the sake of conciseness, they will not be described here.

Referring to FIG. 1, the backlight module comprises an outer frame 12, a light guide plate 13, a glue frame 14, a heat dissipating plate 30, and a connecting bolt 40 for fixedly connecting the outer frame 12, the glue frame 14 and the heat dissipating plate 30 together. The heat dissipating plate 30 is bent, namely provided with a baseplate 31 and a side wall 32 which is substantially vertical to the baseplate 31. When being assembled, the baseplate 31 is located below the light guide plate 13, and the side wall 32 is located at the light-incoming side of the light guide plate 13. A light source lamp 33 is arranged on the side wall 32 of the heat dissipating plate 30, so that light can be emitted to the light guide plate 13 to illuminate the liquid crystal screen. The light source lamp 33 being directly arranged on the heat dissipating plate 30 not only improves the heat dissipating performance of the backlight module, but also saves components (not shown) for mounting the light source lamp 33. In this case, the objective of greatly narrowing the frame of the liquid crystal display 10 is achieved. It should be noted that FIG. 1 merely schematically shows the mounting position of the light source lamp 33 relative to the light guide plate 13, and it does not necessarily overlap with the position of the connecting bolt 40.

Projections 36 are arranged on the baseplate 31 of the heat dissipating plate 30. When assembled, the projections 36 will contact with the light guide plate 13, thereby improving the heat dissipating performance of the backlight module. Moreover, the heat dissipating plate 30 with such a structure can also support the light guide plate 13, thereby improving the mechanical property of the backlight module.

Referring to FIG. 1, an inserting port 15 is configured on the glue frame 14, a first positioning hole 34 is formed on the side wall 32 of the heat dissipating plate 30, and a second positioning hole 35 corresponding to the first positioning hole 34 is formed on the outer frame 12. In order to position the glue frame 14, a portion on the outer frame 12 around the second positioning hole 35 is configured as being depressed inwards and extending into the inserting port 15. To improve the overall stability of the backlight module, the connecting bolt 40 is also arranged as passing through the first positioning hole 34 and the second positioning hole 35, so as to fix the outer frame 12, the glue frame 14, and the heat dissipating plate 30 together.

Figure 2:
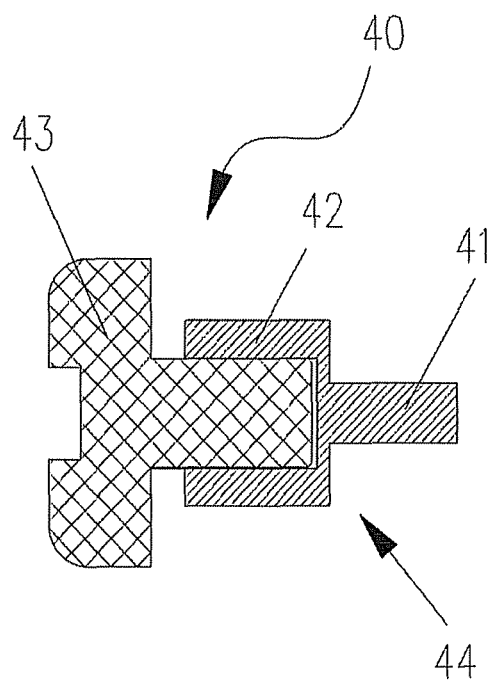
FIG. 2 schematically shows structure of a connecting bolt according to the first example of the present disclosure.

FIG. 1 and FIG. 2 show the first embodiment of the fixing bolt. The fixing bolt 40 comprises two portions, wherein the first end portion is a body 44 with a cylinder 41 and an accommodation groove 42, and the second portion is a screw 43 in cooperation with the accommodation groove 42. When assembled, the cylinder 41 can be fixedly arranged in the first positioning hole 34, preferably by riveting, and the accommodation groove 42, facing away the light guide plate 13, is accommodated in the second positioning hole 35, so that the screw 43 can be fixedly connected (preferably through thread connection in an example) to the accommodation groove 42 from a region outside of the outer frame 12 and thus compresses the outer frame 12. Under the extrusion of the screw 43 and the positioning action of the accommodation groove 42, the outer frame 12 can be fixed relative to the heat dissipating plate 30, thus realizing the positioning of the glue frame 14. In addition, the screw 43 is indirectly connected with the heat dissipating plate 30 through the body 43, so that the force applied on the heat dissipating plate 30 is relatively small, and the relatively thin heat dissipating plate 30 can be protected from damage.

Referring to FIG. 2, the cross section of the cylinder 41 is smaller than that of the accommodation groove 42. As a result, the body 43 of the fixing bolt 40 is substantially in the shape of a red wine goblet. Because the cross section of the cylinder 41 is relatively small, the size of the first positioning hole 34 is correspondingly small. Thus, the damage to the heat dissipating plate 30 can be reduced. Consequently, the production of the heat dissipating plate 30 can be thus facilitated.

Figure 3:
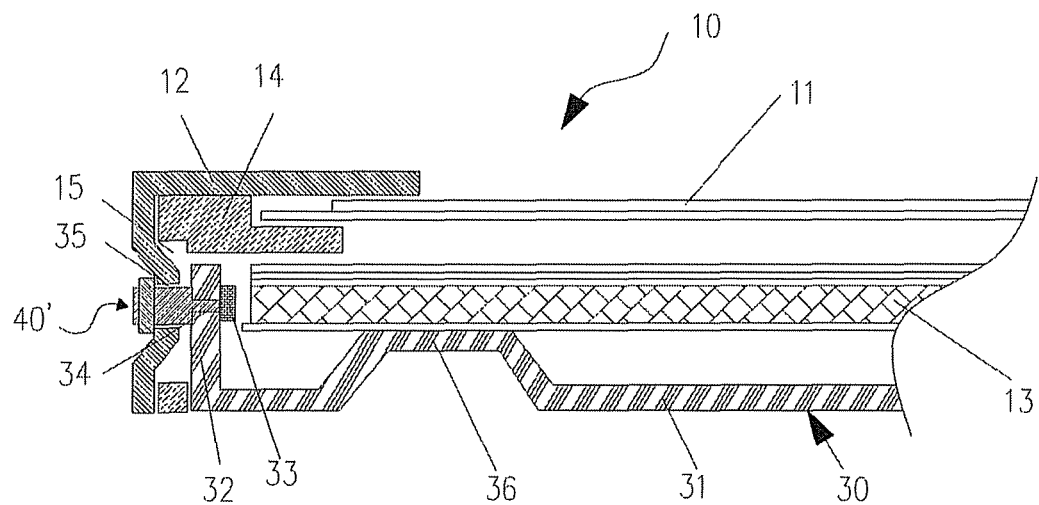
FIG. 3 schematically shows the cross section of a second example of the liquid crystal display according to the present disclosure.
Figure 4:
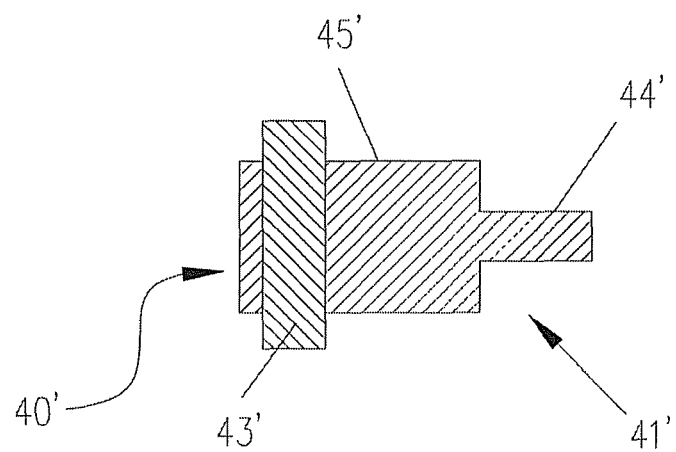
FIG. 4 schematically shows the structure of a connecting bolt according to the second example of the present disclosure.

FIG. 3 schematically shows a cross section diagram of a liquid crystal display 10 according to the second example of the present disclosure. FIG. 3 and FIG. 4 further show a second embodiment of the fixing bolt. The fixing bolt 40' comprises a cylinder 41' and a locking cap 43' in cooperation with the cylinder 41'. In an example, external threads are formed on the fixing bolt 40', and the locking cap 43' is a nut. When being assembled, the cylinder 41' extends through the first positioning hole 34 and the second positioning hole 35. The first end portion 44' of the cylinder 41' is fixedly connected to the first positioning hole 34, and the locking cap 43' is fixedly coupled to the second end portion 45' of the cylinder 41' from a region outside the outer frame 12 and compresses the outer frame 12. In this case, under the extrusion of the locking cap 43' and the positioning action of the cylinder 41', the outer frame 12 can be fixed relative to the heat dissipating plate 30, thus realizing the positioning of the glue frame 14.

The cross section of the first end portion 44' of the cylinder 41' is relatively small, whereas the cross section of the second end portion 45' is relatively large. Thus, the cylinder 41' is in a stepped shaft shape as a whole. Because the cross section of the first end portion 44' is relatively small, the size of the first positioning hole 34 is correspondingly small, so that the damage to the heat dissipating plate 30 is relatively small, thereby the production of the heat dissipating plate 30 can be facilitated. The cross section of the second end portion 45' is relatively large, so that the connecting strength of the fixing bolt 40' can be improved.

Referring to FIG. 1 and FIG. 3, neither the cylinder 41 of the fixing bolt 40 nor the cylinder 41' of the fixing bolt 40' protrudes out of the inner surface of the heat dissipating plate 30. Thus, the light source lamp 33 can be arranged in a convenient manner, and light emitted by the light source lamp 33 will not be blocked. Therefore, the brightness of the backlight module can be improved. In addition, none of the screw 43, the second end portion 45' of the cylinder 41', and the locking cap 43' protrudes out of the plane of the outer frame 12. On the whole, the outer frame 12 is flat without projections, so that appearance of the product can be improved.

Although the present disclosure has been described with reference to preferred examples, various modifications could be made to the present disclosure without going beyond the scope of the present disclosure and components in the present disclosure could be substituted by equivalents. Particularly, as long as no structural conflict exists, all technical features referred to in all the examples can be combined in any manner. The present disclosure is not limited to the specific examples disclosed in the description, but rather includes all the technical solutions falling into the scope of the claims.

The invention claimed is:

1. A backlight module, comprising
an outer frame, and a glue frame, a bent heat dissipating plate and a light guide plate all mounted within the outer frame, a light source lamp facing the light guide plate being arranged on the side wall of the heat dissipating plate at the light-incoming side of the light guide plate, wherein:
an inserting port is formed on the glue frame,
a first positioning hole corresponding to the inserting port is formed on the side wall of the heat dissipating plate at the light-incoming side of the light guide plate, and a second positioning hole corresponding to the first positioning hole is formed on the outer frame,
the portion of the outer frame around the second positioning hole is depressed inwards and extends into the inserting port to position the glue frame, and the outer frame, the glue frame and the heat dissipating plate are fixed together by a fixing bolt passing through the first positioning hole and the second positioning hole,
the fixing bolt comprises a body with a cylinder and an accommodation groove, and a screw in cooperation with the accommodation groove, and
when being assembled, the cylinder is fixedly connected to the first positioning hole, and the accommodation groove, facing away from the light guide plate, is accommodated in the second positioning hole, with the screw fixedly coupled to the accommodation groove from a region outside the outer frame and compressing the outer frame.

2. The backlight module according to claim 1, wherein the cross section of the cylinder is smaller than that of the accommodation groove.

3. The backlight module according to claim 2, wherein the cylinder is in rivet connection with the first positioning hole, and the screw is in threaded connection with the accommodation groove.

4. The backlight module according to claim 3, wherein the cylinder of the fixing bolt does not protrude out of the inner surface of the heat dissipating plate.

5. The backlight module according to claim 4, wherein the screw does not protrude out of the plane of the outer frame.

6. The backlight module according to claim 1, wherein the fixing bolt comprises a cylinder and a locking cap in cooperation with the cylinder,
when being assembled, the cylinder is configured to extend through the first positioning hole and the second positioning hole, with a first end portion of the cylinder being fixedly connected to the first positioning hole, and the locking cap is fixedly coupled to a second end portion of the cylinder from a region outside of the outer frame.

7. The backlight module according to claim 6, wherein the cylinder is in the shape of a stepped shaft, a portion with relatively small cross-section in the cylinder being the first end portion and a portion with relatively large cross-section being the second end portion.

8. The backlight module according to claim 7, wherein the first end portion of the cylinder is in rivet connection with the first positioning hole and the locking cap is in threaded connection with the second end portion of the cylinder.

9. The backlight module according to claim 8, wherein the first end portion of the cylinder does not protrude out of the inner surface of the heat dissipating plate.

10. The backlight module according to claim 9, wherein neither the second end portion of the cylinder nor the locking cap protrudes out of the plane of the outer frame.

11. A liquid crystal display including the backlight module according to claim 1.

* * * * *